United States Patent

Honma et al.

[11] Patent Number: 4,515,384
[45] Date of Patent: May 7, 1985

[54] FRONT WHEEL SUSPENSION SYSTEM FOR A MOTORCYCLE

[75] Inventors: Kenji Honma; Toshio Asami; Masayuki Baba, all of Saitama; Sumio Nakayama, Shizuoka, all of Japan

[73] Assignees: Honda Giken Kogyo Kabushiki Kaisha; Showa Manufacturing Co., Ltd., both of Tokyo, Japan

[21] Appl. No.: 418,291

[22] Filed: Sep. 15, 1982

[30] Foreign Application Priority Data

Sep. 19, 1981 [JP] Japan ................................ 56-148029

[51] Int. Cl.³ ...................... B60G 17/08; B62K 25/08
[52] U.S. Cl. ................................... 280/276; 188/272; 188/287; 188/318; 280/703
[58] Field of Search ............... 180/227, 231, 219, 218; 280/276, 275, 279, 703; 188/272, 282, 299, 317, 318, 287; 267/57 R; 251/206

[56] References Cited

U.S. PATENT DOCUMENTS

| | | | |
|---|---|---|---|
| 3,103,993 | 9/1963 | Gies | 188/318 X |
| 3,584,712 | 6/1971 | Dickinson | 188/282 |
| 3,889,934 | 6/1975 | Kamman | 188/287 X |
| 3,912,054 | 10/1975 | Fabre et al. | 280/276 X |
| 3,989,261 | 11/1976 | Kawaguchi | 188/272 X |
| 4,147,371 | 4/1979 | Morita et al. | 280/276 |
| 4,278,266 | 7/1981 | Inoue et al. | 180/219 X |
| 4,295,658 | 10/1981 | Kashima | 280/276 |
| 4,392,664 | 7/1983 | Tsuchiya et al. | 280/276 |

FOREIGN PATENT DOCUMENTS

| 2723102 | 11/1978 | Fed. Rep. of Germany | 188/317 |
|---|---|---|---|
| 2291417 | 6/1976 | France | 188/299 |

Primary Examiner—Joseph F. Peters, Jr.
Assistant Examiner—Mitchell J. Hill
Attorney, Agent, or Firm—Irving M. Weiner; Pamela S. Burt

[57] ABSTRACT

A front wheel suspension system for a motorcycle including a telescopic hydraulic shock absorber mechanism which provides an anti-dive function upon braking of a front wheel of the motorcycle. In addition to a main oil passage which is intercepted upon braking of the front wheel, a bypass oil passage is provided between inner and outer tubular members comprising a fork pipe and a bottom case, respectively, disposed in a telescopically fitted relationship with each other. An adjustable orifice mechanism is provided in an intermediate position in the bypass oil passage. The suspension system provides an appropriate adjustment of the damping effect of the shock absorber mechanism in a direction of contraction of a front fork upon an anti-dive operation.

12 Claims, 11 Drawing Figures

FRONT WHEEL SUSPENSION SYSTEM FOR A MOTORCYCLE

BACKGROUND OF THE INVENTION

1. Field of the Invention

The present invention relates generally to a front wheel suspension system for a motorcycle. More particularly, the invention relates to a front wheel suspension system for a motorcycle of the type including a telescopic hydraulic shock absorber mechanism which provides an anti-dive function upon braking of a front wheel of the motorcycle.

2. Description of Relevant Art

Various conventional motorcycles employ, as a means for supporting a front wheel, a telescopic front fork including two sets of axially slidable inner and outer tubular members, each set of the tubular members including a fork pipe and a bottom case, respectively, and a hydraulic system interposed between the two tubular members for providing a shock absorbing action. Upon braking of such conventional motorcycles, displacement of the center of gravity, a force of inertia, etc., act in a direction to contract the front fork. Particularly, upon sudden braking, the front fork will come to assume the fully contracted position thereof.

A front wheel suspension system for a motorcycle is already known which includes a contraction restraining mechanism for intercepting, upon braking of a front wheel of the motorcycle, a main oil communicating passage between a fork pipe and a bottom case to restrain axially contracting motion between the fork pipe and the bottom case in order to prevent a front part of the motorcycle from diving or moving down by sudden braking operation of the front wheel.

In such a conventional front wheel suspension system for a motorcycle, a damping force in a direction to contract a front fork when a contraction restraining mechanism is operative is caused to be substantially constant due to a reactive force against the braking, resulting in difficulty in attaining an appropriate adjustment.

The present invention effectively overcomes the foregoing disadvantages attendant the above-described conventional front wheel suspension system for a motorcycle.

SUMMARY OF THE INVENTION

The present invention provides a front wheel suspension system for a motorcycle of the type which includes two sets of inner and outer tubular members, each set of the tubular members including an axially slidable fork pipe and a bottom case, respectively, a hydraulic system interposed between the tubular members for providing a damping action, and a contraction restraining mechanism for intercepting a main communicating oil passage between the fork pipe and the bottom case to restrain an axial contracting motion between the fork pipe and the bottom case, wherein the improvement comprises a bypass oil passage disposed below the bottom case for communicating between the inner and outer tubular members, and an adjustable orifice means provided in the bypass oil passage.

It is an object of the present invention to provide a front wheel suspension system for a motorcycle wherein a damping effect of a front fork in a direction of contraction thereof, upon an anti-dive operation, can be appropriately adjusted.

The above and further objects, details and advantages of the present invention will become apparent from the following detailed description when read in conjunction with the accompanying drawings.

DETAILED DESCRIPTION OF PREFERRED EMBODIMENTS

Figure 1:
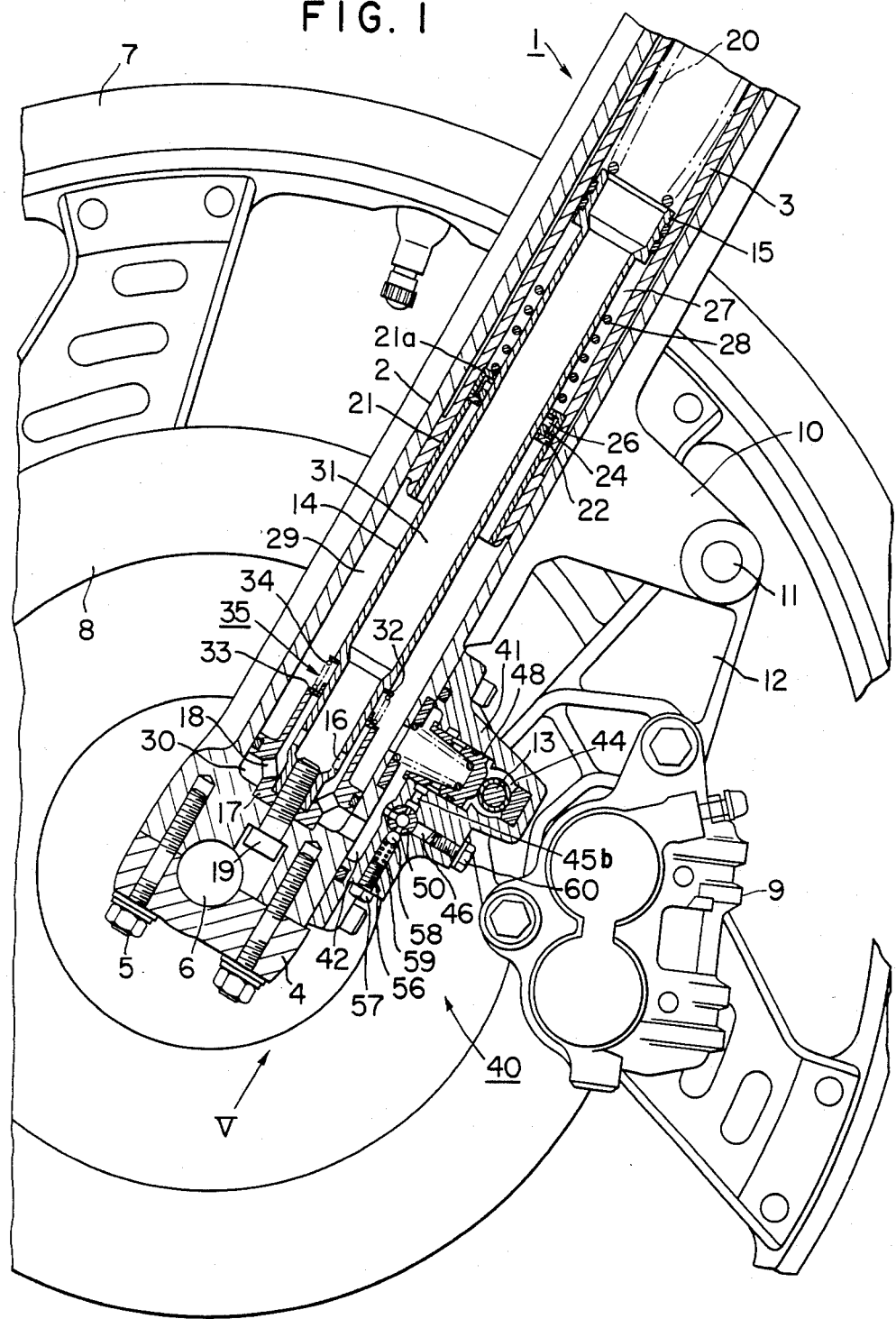
FIG. 1 is a side elevational view, partly in section, showing a front wheel suspension system for a motorcycle in accordance with a preferred embodiment of the present invention.

With reference to FIG. 1, there is illustrated a telescopic front fork 1 for a motorcycle which includes a pair of bottom cases 2 (only one being shown) and a pair of fork pipes 3 (only one being shown) fitted for axial sliding motion in the respective bottom cases 2. A front axle 6 is integrally mounted on each of the lower parts of the bottom cases 2 of the front fork 1 by means of an axle holder 4 and bolts 5. A front wheel 7 is mounted for rotation on the front wheel axle 6 via a bearing (not shown).

Annular brake disks 8 are integrally mounted on opposite left and right sides of a front wheel hub (not shown), and a brake caliper 9 is disposed so as to extend across the brake disks 8 over the outer diameter portions thereof. The brake caliper 9 is mounted on a caliper bracket 12 which is supported for pivotal motion about a shaft 11 mounted on a boss 10 extending from the bottom case 2 in a rearward direction of a body of the motorcycle.

On the inside of the lower end of the bottom case 2, a lower end of a seat pipe 14 is secured in an integral and concentric relationship with the bottom case 2 by means of a bolt 19 with a metal partition member 17 interposed therebetween. A piston 15 is formed integrally at the opposite upper end of the seat pipe 14 and is fitted in an inner circumferential surface of the fork pipe 3 of the telescopic front fork 1 in sliding oil-tight relationship therewith. A compression coil spring 20 is interposed between an upper end (not shown) of the fork pipe 3 and an upper end of the piston 15 within the fork pipe 3 so that, when there is no compressing force applied between the fork pipe 3 and the bottom case 2 of the telescopic front fork 1, the front fork 1 is held in an extended position due to an urging force of the compression coil spring 20.

Figure 3:
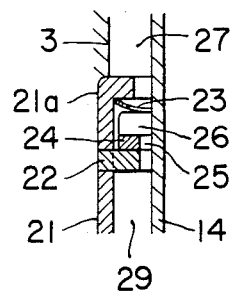
FIG. 3 is a vertical cross-sectional view of an upper check valve shown in FIG. 1.
Figure 4:
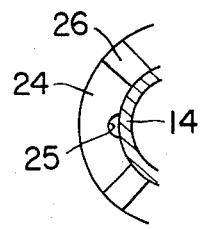
FIG. 4 is a transverse cross-sectional view of the upper check valve of FIG. 1.
Figure 5:
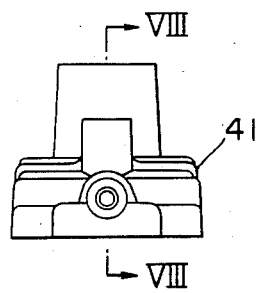
FIG. 5 is a view of a casing in the embodiment of FIG. 1 as viewed in the direction of arrow V in FIG. 1.
Figure 6:
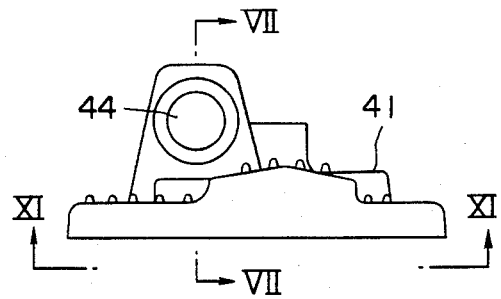
FIG. 6 is a side elevational view of the casing.
Figure 7:
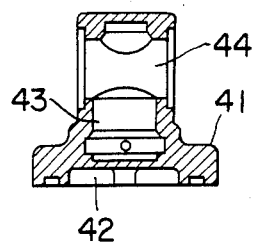
FIG. 7 is a transverse sectional view taken along line VII—VII of FIG. 6.
Figure 8:
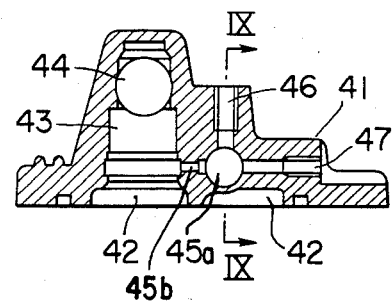
FIG. 8 is a vertical cross-sectional view taken along line VIII—VIII of FIG. 5.

An inner tube 21 is integrally fitted on an inner circumferential surface of the lower end of the fork pipe 3 and has disposed therein a valve seat 22 in the form of an annular disk having an inner diameter greater than the outer diameter of the seat pipe 14, and a spring plate 23 substantially in the form of an annular disk, as shown in FIG. 3. A check valve 24 is positioned on the top face of the valve seat 22 and has an outer diameter which is less than the inner diameter of the inner tube 21 and an inner diameter substantially conforming to the outer diameter of the seat pipe 14. The check valve 24 has a plurality of notches 25 formed along the inner circumferential edge thereof as shown in FIG. 4, each notch 25 serving as an orifice, and also has a plurality of projections 26 formed on the top face along a circumferential portion thereof. The check valve 24 is positioned such that the projections 26 thereof are engaged and held down by the inner projections of the spring plates 23, respectively, as shown in FIG. 3.

The inner tube 21 has, at the top end thereof, an inwardly extending flange 21a having an inner diameter greater than the outer diameter of the seat pipe 14, and a compression coil spring 28 having a predetermined height is positioned on an upper face of the flange 21a of the inner tube 21 so that a damping action may be obtained by an urging force of the compression coil spring 28 when an extending force is applied between the fork pipe 3 and the bottom case 2 to move the check valve 24 near to the piston 15.

In particular, during a compressing stroke of the telescopic front fork 1, the check valve 24 is forced upwardly against the spring plate 23 by pressurized oil within a lower oil pressure generating chamber 29 which is defined by the bottom case 2, the seat pipe 14 and the metal partition member 17, and thus is disengaged from the valve seat 22 to allow the pressurized oil to flow upwardly under relatively low flow resistance. On the contrary, during an extending stroke of the fork 1, pressurized oil in an upper oil chamber 27 which is defined by the bottom case 2, the seat pipe 14 and the piston 15 flows back into the oil pressure generating chamber 29 under relatively high flow resistance through orifices which are defined by the notches 25 of the check valve 24 and an outer wall of the seat pipe 14.

The oil pressure generating chamber 29 defined by the bottom case 2, the seat pipe 14 and the metal partition member 17 is connected to a communicating chamber 30 defined by the bottom case 2 and the metal partition member 17 by way of a contraction restraining mechanism 40 as described hereinbelow. The communicating chamber 30 is in turn connected to a reservoir chamber 31 defined by the seat pipe 14 and the fork pipe 3 by way of openings in the metal partition member 17 and further by way of openings in the seat pipe 14. Thus, during a contracting stroke of the telescopic front fork 1, pressurized oil in the oil pressure generating chamber 29 flows into the reservoir chamber 31 by way of the communicating chamber 30 after the pressure thereof has been reduced due to predetermined flow resistance provided by the contraction restraining mechanism 40. Thus, both the urging force of the compression coil spring 20 interposed between the piston 15 and the fork pipe 3 and the flow resistance of the contraction restraining mechanism 40 act to damp shocks and vibrations of the motorcycle during operation thereof.

A check valve mechanism 35 is additionally provided on the top end of the metal partition member 17, and includes a receiving metal member 32 fitted on and secured to the seat pipe 14, a slidable member 33, and a compression coil spring 34 interposed between the receiving metal member 32 and the slidable member 33. Thus, pressurized oil in the reservoir chamber 31 is allowed to flow back into the oil pressure generating chamber 29 under relatively low flow resistance due to the check valve mechanism 35.

Figure 2:
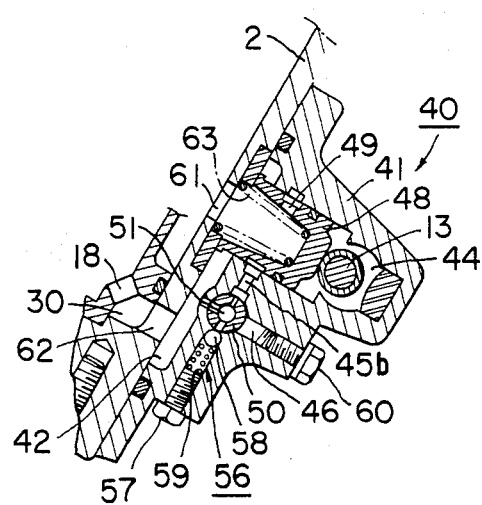
FIG. 2 is a cross-sectional view showing the front wheel suspension system in a position during braking of the front wheel.

As shown in FIGS. 1 and 2, the contraction restraining mechanism 40 is disposed rearwardly of the bottom case 2 below the boss 10, and includes a casing 41, an anti-dive piston 48 fitted in an oil-tight and sliding relationship in a cylinder chamber 43 in the casing 41 and normally urged in a direction away from the bottom case 2 by a spring 63, a rotatable adjusting orifice member 50 rotatably fitted in a cylindrical hole 45a defined in the casing 41 and communicating with an opening 49 of the piston 48 through a first passage 45b, and a stopper mechanism 56 for fixture of the orifice member 50.

As shown in FIGS. 1, 5 to 8 and 11, the casing 41 has formed therein a main oil passage 42 which connects an upper opening 61 facing the oil pressure generating chamber 29 within the bottom case 2 to a lower opening 62 facing the communicating chamber 30, the aforesaid cylinder chamber 43 which is opposed to the opening 61, a shaft receiving hole 44 which communicates with the top of the cylinder chamber 43 and has a shaft 13 (FIG. 2) loosely fitted therein which is mounted on the caliper bracket 12, the second passage 45c which communicates between the cylindrical hole 45a for receiving the orifice member 50 and the lower end of the main oil passage 42, a drain bolt hole 46 which communicates with the cylindrical hole 45a (a drain bolt 60 being threadedly received in the drain bolt hole 46), and a stopper chamber 47 which contains therein the stopper mechanism 56 for fixture of the orifice member 50. In this construction, the cylindrical hole 45a, the first passage 45b and the second passage 45c together define a bypass oil passage which communicates between the upper and lower ends of the main oil passage 42. In other words, the bypass oil passage is arranged in parallel with the main oil passage.

Figure 9:
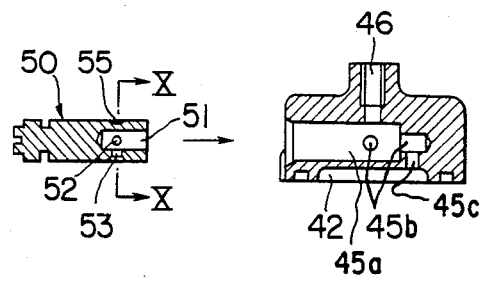
FIG. 9 is a transverse cross-sectional view taken along line IX—IX of FIG. 8, showing components in a disassembled condition.
Figure 10:
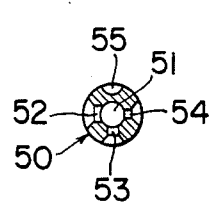
FIG. 10 is a transverse cross-sectional view taken along line X—X of FIG. 9.
Figure 11:
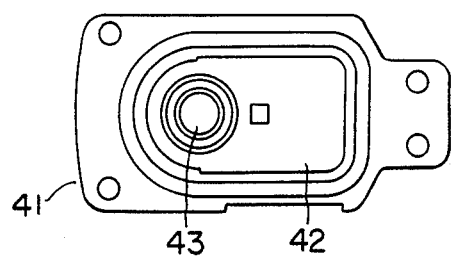
FIG. 11 is a view taken along line XI—XI of FIG. 6.

As shown in FIGS. 9 and 10, the rotatable adjusting orifice member 50 has formed therein a center passage 51, radially extending communicating passages 52, 53 and 54 of different diameters which are disposed in an angularly spaced relationship so as to be at right angles with each other and to communicate with the center passage 51, and a recess 55 which does not communicate with the center passage 51.

As shown in FIGS. 1 and 2, the stopper mechanism 56 for fixture of the orifice member includes an adjusting bolt 57 for backward and forward adjustment, a ball 58 disposed as an engaging member for engagement with the communicating passages 52, 53, 54 and the recess 55, and a compression coil spring 59 interposed between the adjusting bolt 57 and the ball 58.

With the above-described structure, if an upward impact force acts upon the front wheel 7 during normal operation wherein the front brake caliper 9 remains inoperative and thus no braking force is applied to the front wheel 7, pressurized oil in the oil pressure generating chamber 29 is caused to pass through the opening 61, the main oil passage 42, the opening 62, the communicating chamber 30 and the openings 18, 16 to flow into the reservoir chamber 31 so as to cause the contracting motion between the fork pipe 3 and the bottom case 2, whereupon the upward shock which has acted upon the front wheel 7 is damped by the urging force of the compression coil spring 20 interposed between the fork pipe 3 and the piston 15 and also by the flow resistance of such course of the oil.

Meanwhile, if a downward force acts upon the front wheel 7 while no braking force is applied thereto, then the telescopic front fork 1 can extend rapidly because the anti-dive piston 48 is spaced from the bottom case 2 by the urging force of the coil spring 63 and further pressurized oil in the reservoir chamber 31 takes a course of low flow resistance, flowing from the opening 16 into the oil pressure generating chamber 29 by way of the check valve 35.

On the other hand, if the front brake caliper 9 is operated so that a braking force is applied to the front wheel 7, a counterclockwise force about the axle 6 as viewed in FIG. 1 acts upon the caliper bracket 12 through the caliper 9, whereupon the anti-dive piston 48 is pushed by the shaft 13 on the caliper bracket 12 into abutment with the bottom case 2 against the urging force of the coil spring 63 to intercept the main oil passage 42. That is, the anti-dive piston 48, the coil spring 63 and the shaft 13 cooperate to serve as a valve mechanism for intercepting the main oil passage 42 upon braking of the motorcycle. In this condition, pressurized oil in the oil pressure generating chamber 29 which is acted upon by a force to contract the front fork 1 caused by a displacement of the center of gravity, a force of inertia, etc., upon braking of the front wheel 7, passes the opening 61, the piston opening 49, the first passage 45b, either one of the communicating passages 52, 53, 54, the center passage 51, the second passage 45c, the opening 62, the communicating chamber 30, and the openings 18, 16 to flow into the reservoir chamber 31. Consequently, there results a relatively high flow resistance compared with the corresponding resistance upon no braking of the motorcycle, and thus an extensive diving or downward movement of the telescopic front fork 1 can be advantageously prevented.

In addition, if the front wheel 7 is subjected to an upward shock when the front brake caliper 9 is operated and thus a braking force is applied to the front wheel 7, a force of the pressurized oil generated in the oil pressure generating chamber 29 by the shock and an urging force of the coil spring 63 cooperate to cause the anti-dive piston 48 to push the shaft 13 back in the rightward direction in FIG. 1 against a force originated by the braking force acting upon the front brake caliper 9 to push the shaft 13 in a leftward direction. As a result, the main oil passage 42 is brought into communication and thus the upward shock is damped in a similar shock absorbing manner to that provided during normal operation.

According to the above described structure, resistance to the flow of the oil can be selectively preset to four different levels by angularly rotating the rotatable adjustable orifice member 50 a suitable number of times by an angle of 90° using a driver or a similar tool to bring any one of the communicating passages 52, 53, 54 or the recess 55 of the orifice member 50 into register with the bypass passage 45. Thus, a desired anti-dive characteristic can be obtained thereby.

It is to be noted that, while the adjustment of a course of oil is attained by an angular rotation of the orifice in the preferred embodiment, changing over of a course of oil can otherwise be attained by an axial sliding movement of a modified orifice which has a plurality of communicating passages of different diameters formed therein in a row along an axial direction thereof.

Also, it is to be noted that, while in the illustrated and described preferred embodiment the present invention is applied to a motorcycle, it is contemplated that the invention can also be applied to a tricycle type motor vehicle having a front wheel and two rear wheels.

Although there have been described what are at present considered to be the preferred embodiments of the present invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A front wheel suspension system for a motorcycle, comprising:
    a fork pipe and a bottom case;
    an oil pressure generating chamber defined by said fork pipe and said bottom case;
    a reservoir chamber communicating with said oil pressure generating chamber;
    a main oil passage connected with said oil pressure generating chamber and said reservoir chamber for conducting oil from said oil pressure generating chamber into said reservoir chamber upon a contracting motion between said fork pipe and said bottom case; and
    a contraction restraining mechanism cooperating with a brake mechanism of said motorcycle, said contraction restraining mechanism comprising:
        a valve mechanism interposed in said main oil passage and operatively connected with said brake mechanism for intercepting said main oil passage upon braking of said motorcycle;
        a bypass oil passage connected to said valve mechanism and communicating with said reservoir chamber; and
        adjustable orifice means, interposed in said bypass oil passage, for adjusting a resistance to flow of said oil.

2. A front wheel suspension system according to claim 1, wherein:
    said adjustable orifice means has a resistance to flow of said oil which is selectable from among a plurality of predetermined levels of resistance to flow.

3. A front wheel suspension system according to claim 2, wherein:
    said orifice means includes a rotatable member having a plurality of selectively usable orifice holes formed therein, and a stopper mechanism operable to selectively stop said rotatable member at a plurality of predetermined rotational positions.

4. A front wheel suspension system according to claim 3, wherein:
    said stopper mechanism includes an engaging member which is engaged with said rotatable member when pressed toward said rotatable member, an adjusting bolt member mounted for backward and forward adjustment, and a resilient member interposed between said bolt member and said engaging member.

5. A front wheel suspension system according to claim 3, wherein:

said rotatable member comprises a hollow tube portion thereof having said orifice holes perforated in radial directions of said hollow tube portion.

6. A front wheel suspension system according to claim 5, wherein:

said orifice holes have relatively different diameters.

7. A front wheel suspension system according to claim 6, wherein:

said orifice holes are disposed along a circumferential portion in an angularly spaced relationship at an angle of substantially 90° from each other.

8. A front wheel suspension system according to claim 7, wherein:

said hollow tube has up to three said orifice holes provided therein.

9. A front wheel suspension system according to claim 4, wherein:

said engaging member is disposed for engagement with said orifice holes.

10. A front wheel suspension system according to claim 9, wherein:

said rotatable member has at least one recess formed therein which is disposed for engagement with said engaging member.

11. In a front wheel suspension system for a motorcycle of the type which includes at least one set of inner and outer tubular members, each set of said tubular members including an axially slidable fork pipe and a bottom case, respectively, a hydraulic system interposed between said tubular members for providing a damping action, and a contraction restraining mechanism for intercepting a main communicating oil passage between said fork pipe and said bottom case to restrain an axial contracting motion between said fork pipe and said bottom case, the improvement comprising:

a bypass oil passage disposed in said bottom case and communicating between said inner and outer tubular members;

an adjustable orifice means provided in said bypass oil passage;

said orifice means having a resistance to flow of said oil which is selectable from among a plurality of predetermined levels of flow resistance;

said orifice means including a rotatable member having a plurality of selectively usable orifice holes formed therein, and a stopper mechanism operable to selectively stop said rotatable member at a plurality of predetermined rotational positions;

said stopper mechanism including an engaging member which is engaged with said rotatable member when pressed toward said rotatable member, an adjusting bolt member mounted for backward and forward adjustment, and a resilient member interposed between said bolt member and said engaging member; and said engaging member being disposed for engagement with said orifice holes.

12. A front wheel suspension system according to claim 11, wherein:

said rotatable member has at least one recess formed therein which is disposed for engagement with said engaging member.

* * * * *